United States Patent [19]

Takahara et al.

[11] Patent Number: 4,804,882
[45] Date of Patent: Feb. 14, 1989

[54] CATHODE-RAY TUBE INCLUDING A WHITE PHOSPHOR SCREEN

[75] Inventors: Takeshi Takahara, Yokosuka; Mitsuhiro Oikawa, Yokohama; Yoshinori Tetsuishi; Kazuaki Higuchi, both of Fukaya; Masaaki Tamatani, Fujisawa, all of Japan

[73] Assignees: Kabushiki Kaisha Toshiba, Kawasaki; Hokuto Electronics Co., Ltd., Asahikawa, both of Japan

[21] Appl. No.: 69,444

[22] Filed: Jul. 2, 1987

[30] Foreign Application Priority Data

Jul. 4, 1986 [JP] Japan ................. 61-156110

[51] Int. Cl.$^4$ ................. H01J 29/20; C09K 11/477
[52] U.S. Cl. ................. 313/468; 313/467; 252/301.6 S; 252/301.4 S
[58] Field of Search ................. 313/467, 468, 487; 252/301.4 S, 301.6 R, 301.6 S

[56] References Cited

U.S. PATENT DOCUMENTS

| | | | |
|---|---|---|---|
| 3,394,084 | 7/1968 | Avella | 252/301.4 |
| 4,512,912 | 4/1985 | Matsuda et al. | 313/468 X |
| 4,631,445 | 12/1986 | Hase et al. | 252/301.6 S |
| 4,694,217 | 9/1987 | Morita | 313/468 |

FOREIGN PATENT DOCUMENTS

58-115024 7/1983 Japan.
59-122578 7/1984 Japan.
60-38490 2/1985 Japan.

Primary Examiner—Leo H. Boudreau
Assistant Examiner—Michael Horabik
Attorney, Agent, or Firm—Cushman, Darby & Cushman

[57] ABSTRACT

A cathode-ray tube according to the present invention is provided with a phosphor screen comprising phosphors A, B, and C, wherein each of the phosphors A and B constitute 5 to 15% by weight and, the phosphor C constitutes 70 to 90% by weight. The phosphor A is a bluish white-emitting phosphor $(Y_{1-x-y}Gd_xTb_y)_2O_2S$ ($0 \leq X \leq 0.999999$ and $0.000001 \leq Y \leq 0.001$), the phosphor B is at least one of a blue-emitting silver-activated hexagonal zinc sulfate (ZnS:Ag) phosphor, etc., and the phosphors C is a yellow-emitting phosphor $(In_{1-p-r}M_pTB_qEu_rBO_3)$ (wherein M is at least one element selected from the group consisting of Sc, Lu, Y, Gd, and Ga, and p, q, and r satisfy $0 \leq p \leq 0.2$, $0.0005 \leq q \leq 0.05$, and $0.001 \leq r \leq 0.1$). The cathode-ray tube of the present invention is a phosphor screen which is free from toxicity and has good flickering and brightness characteristics and high current dependence of brightness.

2 Claims, 3 Drawing Sheets

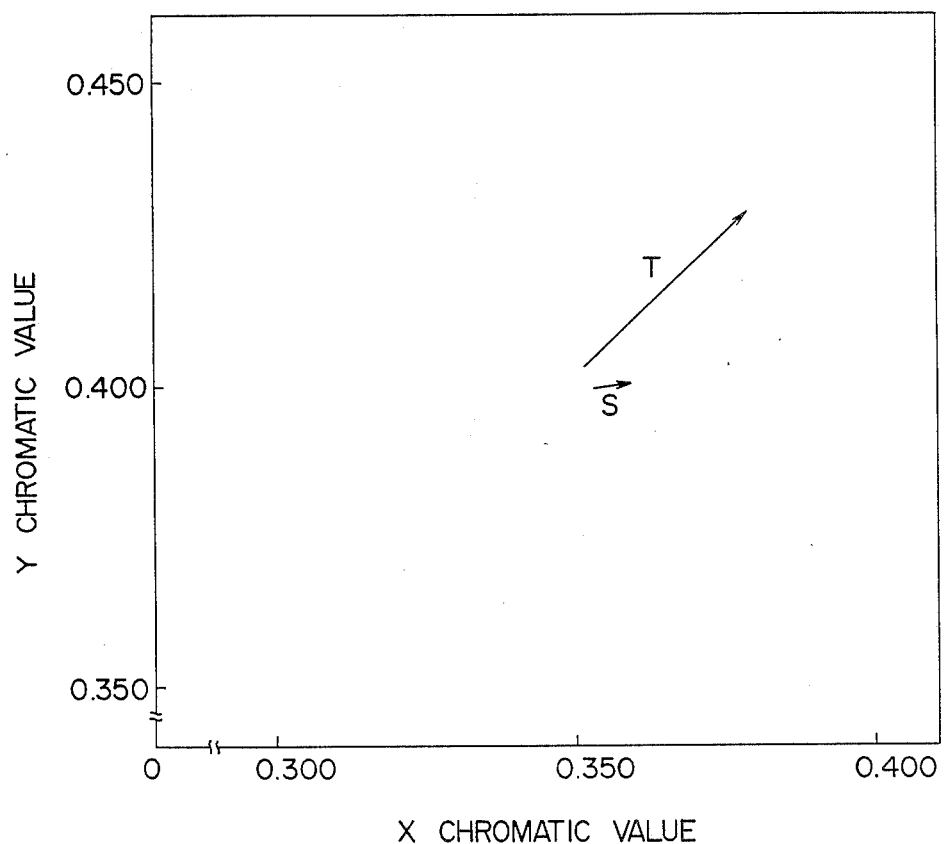
F I G. 3

CATHODE-RAY TUBE INCLUDING A WHITE PHOSPHOR SCREEN

BACKGROUND OF THE INVENTION

The present invention relates to a cathode-ray tube and, more particularly, to a cathode-ray tube used in a display for a computer terminal or the like.

A phosphor mixture prepared by mixing a plurality of different color-emitting phosphors is used for a white phosphor screen in a display such as a computer terminal. Typical examples of the conventional phosphor mixture are listed below:

(1) a phosphor mixture of a blue-emitting silver-activating cubic zinc sulfate (ZnS:Ag) phosphor and a yellow-emitting (as a complementary color of blue) copper-activated zinc-cadmium sulfate {(Zn,Cd)S:Cu};

(2) a phosphor mixture of the above-mentioned blue-emitting phosphor (ZnS:Ag), a green-emitting manganese-arsenic-activated zinc silicate phosphor ($Zn_2SiO_4$:Mn,As), and a red-emitting manganese-activated zinc phosphate phosphor {$Zn_3(PO_4)_2$:Mn} or a manganese-activated zinc magnesium phosphate phosphor {$(Zn,Mg)_3(PO_4)_2$:Mn};

(3) a phosphor mixture (Japanese Patent Disclosure (Kokai) No. 84-122578) of the above-mentioned blue-emitting phosphor (ZnS:Ag), the above-mentioned green-emitting phosphor ($Zn_2SiO_4$:Mn,As), and an orange-emitting cadmium halophosphate phosphor {$Cd_5(PO_4)_3$Cl:Mn}; and (4) a phosphor mixture (Japanese Patent Disclosure (Kokai) No. 85-38490) of the above-mentioned blue-emitting phosphor (ZnS:Ag) and a yellow-emitting phosphor $In_{l-u-v-w}M_uTb_vEu_wBO_3$ (wherein M is at least one element of Sc, Lu, Y, Gd, and Ga and u, v, and w satisfy $u \geq 0$, $v \geq 0$, $w > 0$, and $u+v+w<1$).

Since each of the phosphors of phosphor mixture (1) has a 10% afterglow time of 10 msec or less, flickering of the cathode-ray tube typically occurs.

Since, in phosphor mixture (2), the 10% afterglow time of each of the green-emitting ($Zn_2SiO_4$:Mn,As) and red-emitting {$Zn_3(PO_4)_2$:Mn} and {$(Zn,Mg)_3(PO_4)_2$:Mn} is relatively long, flickering of the screen is reduced. However, phosphor mixture (2) contains the red-emitting phosphor having a low luminous efficacy, and thus, the brightness of the screen is degraded. In addition, phosphor mixture (2) contains arsenic, which is highly toxic, and is thus undesirable from the viewpoint of safety.

In phosphor mixture (3), brightness and flickering characteristics are improved as compared with phosphor mixture (2). However, mixture (3) contains arsenic and cadmium which are highly toxic, thus posing a safety problem.

Phosphor mixture (4) is free from toxicity and has a high luminance. However, the afterglow time of the $In_{l-u-v-w}M_uTb_vEu_wBO_3$ phosphor is shorter than that of each of the aforementioned $Zn_2SiO_4$:Mn,As, $Zn_3(PO_4)_2$:Mn, $(Zn,Mg)_3(PO_4)_2$:Mn, and $Cd_5(PO_4)_3$Cl:Mn phosphors. Therefore, flickering characteristics of phosphor mixture (4) are degraded.

In order to improve the flickering characteristics of phosphor mixture (4), the present inventors replaced the cubic zinc sulfate phosphor as the blue-emitting phosphor with a hexagonal zinc sulfate phosphor (ZnS:Ag) disclosed in Japanese Patent Disclosure Nos. 83-115024 and 83-129083 and the like. As a result, the flickering characteristics could be improved.

However, the hexagonal zinc sulfate phosphor has poor current dependence of brightness. If the screen is made bright by increasing an exciting current in a cathode-ray tube using the above phosphor mixture, white color cannot be satisfactorily saturated and becomes yellowish.

SUMMARY OF THE INVENTION

It is an object of the present invention to provide a cathode-ray tube with a phosphor screen free from toxicity and having good flickering and brightness characteristics and high current dependence of brightness.

According to the present invention, there is provided a cathode-ray tube with a phosphor screen containing phosphors A, B, and C or D, wherein, in relation to 100% of the phosphor mixture, phosphors A and B each constitute 5 to 15% by weight, and phosphor C or D constitutes 70 to 90% by weight of the content thereof, respectively;

A being a bluish white-emitting phosphor $(Y_{l-x-y}Gd_xTb_y)_2O_2S$ ($0 \leq x \leq 0.999999$ and $0.000001 \leq y \leq 0.001$), B being at least one of a blue-emitting silver-activated hexagonal zinc sulfate (ZnS:Ag) phosphor, a blue-emitting silver-activated cubic zinc sulfate phosphor (ZnS:Ag,X) (wherein X is at least one element selected from Ga, In, and Sc), and a blue-emitting silver-activated cubic zinc sulfate-scandium oxide phosphor (ZnS·$zSc_2O_3$:Ag (wherein $1 \times 10^{-5} \leq z \leq 8 \times 10^{-2}$)), C being a yellow-emitting phosphor $(In_{l-p-q-r}M_pTb_qEu_rBO_3)$ (wherein M is at least one element selected from the group consisting of Sc, Lu, Y, Gd, and Ga, and p, q, and r satisfy $0 \leq p \leq 0.2$, $0.0005 \leq q \leq 0.05$, and $0.001 \leq r \leq 0.1$), and D being a phosphor mixture of (d-1) which is a green-emitting phosphor $(In_{l-p-q}M_pTb_qBO_3)$ (wherein M is at least one element selected from the group consisting of Sc, Lu, Y, Gd, and Ga, and p, and q satisfy $0 \leq p \leq 0.2$ and $0.0005 \leq q \leq 0.05$), and (d-2) which is a red-emitting phosphor $(In_{l-p-r}M_pEu_rBO_3)$ (wherein M is at least one element selected from the group consisting of Sc, Lu, Y, Gd, and Ga, and p, and r satisfy $0 \leq p \leq 0.2$ and $0.001 \leq r \leq r \leq 0.1$), a weight ratio of (d-1) to (d-2) being 3 : 7 to 7 : 3.

BRIEF DESCRIPTION OF THE DRAWINGS

FIG. 3 is a graph showing chromatic changes in cathode-ray tube of the present invention and conventional cathode-ray tube.

DETAILED DESCRIPTION OF THE INVENTION

Figure 1:
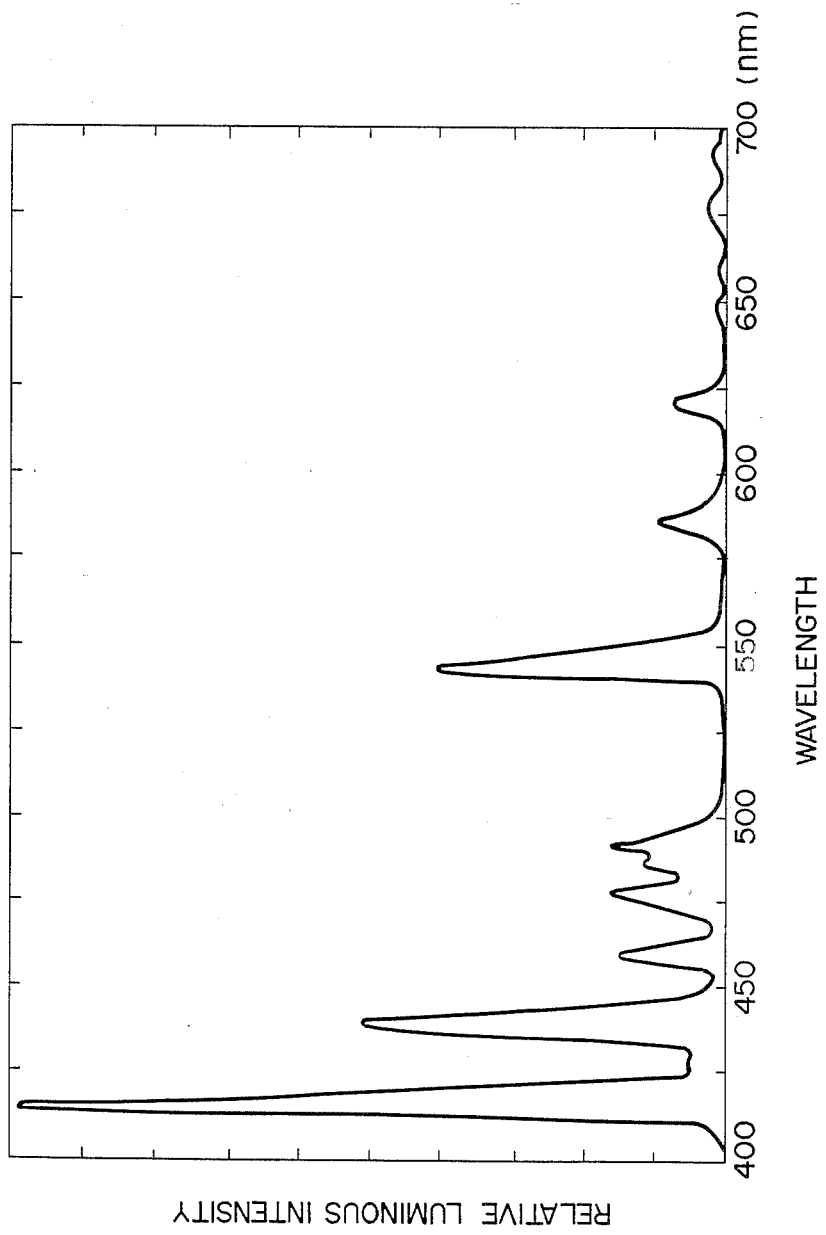
FIG. 1 is a graph showing an emission spectrum of phosphor A according to the present invention.

FIG. 1 shows an emission spectrum of phosphor A $(Y_{l-x-y}Gd_xTb_y)_2O_2S$ used in the present invention. If concentration y of Tb is less than 0.000001, brightness is degraded. However, if concentration y of Tb exceeds 0.01, a peak of the green component at a wavelength of 540 nm is undesirably too high. Concentration y preferably falls within the range of $0.0001 \leq y \leq 0.005$. When the concentration x of Gd is increased, the emission color becomes greenish. However, since preferable concentration y remains unchanged, concentration x should be adjusted subject to concentration y. Ten % afterglow time of phosphor A is about 1 msec and is longer than that (10 msec) of the cubic ZnS:Ag phosphor. Therefore, flickering can be reduced. However, when only phosphor A as the blue-emission component is used together with yellow-emission phosphor C, emission of white color can be obtained only if the content of phosphor A is large. As a result, flickering characteristics of the resultant phosphor screen are degraded, and brightness is also impaired.

According to the present invention, blue-emitting phosphor B is employed, which comprises at least one of ZnS:Ag, ZnS:Ag,X (wherein X is at least one element selected from the group consisting of Ga, In, and Sc), and ZnS·zSc$_2$O$_3$:Ag (wherein $1 \times 10^{-5} \leq z \leq 8 \times 10^{-2}$), so as to obtain white color even if the content of phosphor A is very small.

Phosphor C, used together with phosphors A and B in the present invention, is represented by general formula In$_{l-p-q-r}$M$_p$Tb$_q$Eu$_r$BO$_3$ (wherein M is at least one element selected from the group consisting of Sc, Lu, Y, Gd, and Ga, and p, q, and r satisfy $0 \leq p \leq 0.2$, $0.0005 \leq q \leq 0.05$, and $0.001 \leq r \leq 0.1$). Phopshor C is a yellow-emitting phosphor having a crystal structure such as a calcite. Values p, q, and r are determined by considering brightness and emission colors. However, the following conditions are generally preferred: $0 \leq p \leq 0.1$, $0.001 \leq q \leq 0.03$, and $0.002 \leq r \leq 0.08$.

Phosphor D, used together with phosphors A and B in the present invention, is a phosphor mixture of a green-emitting phosphor represented by general formula (d-1) In$_{l-p-q}$M$_p$Tb$_q$BO$_3$ (wherein M is at least one element selected from the group consisting of Sc, Lu, Y, Gd, and Ga, and p and q satisfy $0 \leq p \leq 0.2$ and $0.0005 \leq q \leq 0.05$) and a red-emitting phosphor represented by general formula (d-2) In$_{l-p-r}$M$_p$Eu$_r$BO$_3$ (wherein M is at least one element selected from the group consisting of Sc, Lu, Y, Gd, and Ga, and p and r satisfy $0 \leq p \leq 0.2$ and $0.001 \leq r \leq 0.1$). When the mixing ratio of (d-1) to (d-2) is 3 : 7 to 7 : 3, phosphor D emits yellow light. Phosphors (d-1) and (d-2) have the same crystal structure as that of calcite. Preferable values p, q, and r are the same as those in phosphor C. The mixing ratio of (d-1) to (d-2) is preferably 4 : 6 to 6 : 4.

Phosphors A and B each constitute 5 to 15% by weight, and phosphor C or D constitutes 70 to 90% by weight of the total content of the resultant phosphor product. If the phosphors fall outside the above content ranges, brightness and emission colors are degraded. Phosphors A and B, as contents of the phosphor product, should preferably fall within the ranges of 8 to 12% by weight, and phosphor C or D, 76 to 84% by weight, respectively.

DETAILED DESCRIPTION OF THE PREFERRED EMBODIMENTS

Example 1

Figure 2:
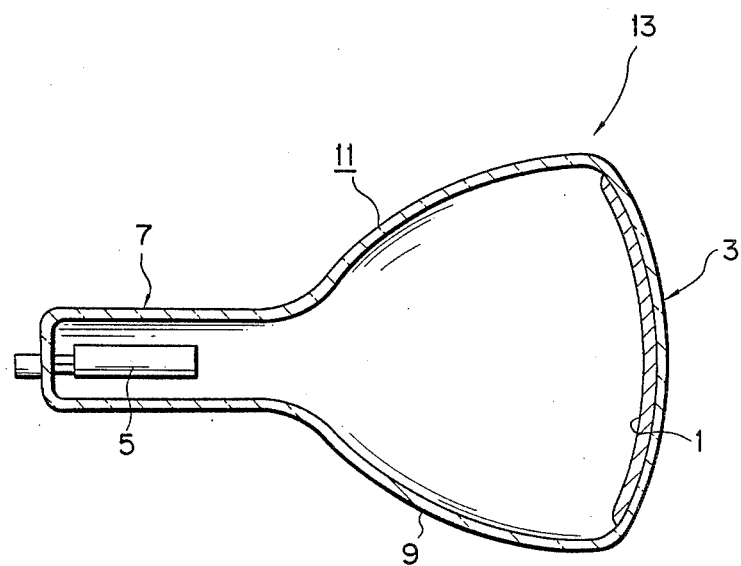
FIG. 2 is a sectional view of a cathode-ray tube according to the present invention.

FIG. 2 is a sectional view of cathode-ray tube 13 according to the present invention. Envelope 11 comprises panel 3 having phosphor screen 1 on its inner surface, neck 7 incorporating electron gun 5, and funnel 9 for connecting panel 3 to neck 7. Phosphor screen 1 contains 8% by weight of phosphor A represented by (Y$_{0.899}$Gd$_{0.1}$Tb$_{0.001}$)$_2$O$_2$S, 12% by weight of phosphor B represented by ZnS:Ag,Ga, 35% by weight of phosphor (d-1) represented by In$_{0.995}$Tb$_{0.005}$BO$_3$ and 45% by weight of phosphor (d-2) represented by In$_{0.97}$Eu$_{0.03}$BO$_3$.

Cathode-ray tube 13 is fabricated as follows. The above phosphor mixture was suspended in an aqueous solution of water glass and was sufficiently stirred to prepare a dispersion. An aqueous solution of heavy metal ions such as barium ions was filled in envelope 11 before electron gun 5 was mounted therein. This aqueous solution is called a cushion solution. The dispersion was mixed with the cushion solution and was left to stand for an hour to precipitate the phosphor mixture. Envelope 11 was inclined to pour the supernatant liquid therefrom. After the deposited film was dried, it was heated to 400° to 500° C. to obtain phosphor screen 1 in panel 3. Electron gun 5 was then mounted in neck 7, and envelope 11 was evacuated and sealed to prepare cathode-ray tube 13.

Example 2-7

Following the same procedures as in Example 1, cathode-ray tubes having different phosphor screens with different mixing ratios and kinds of phosphors A, B and C or D were prepared.

Relative brightness, critical fusion frequencies, x and y chromatic values at an excitation current of 50μA, changes Δx and Δy in x and y chromatic values upon a change in excitation current from 50 to 300μA, and the presence/absence of toxicity of the cathode-ray tubes using the phosphors in Examples 1 to 7 were measured and are summarized in Table 1. Test results of conventional cathode-ray tubes are also summarized as Control 1 to 7 in Table 1. Relative luminous intensities are measured with reference to the luminous intensity of Control 3. The critical fusion frequency is defined as a frequency causing screen flickering when a pulsed excitation current is supplied with a certain frequency to the phosphor screen. If a commercial frequency having an upper limit is taken into consideration, a lower frequency provides good flickering characteristics. Test samples that were turned out to be toxic were not subjected to measurements of changes in chromatic values.

All phosphors of the present invention were not toxic. The critical fusion frequencies of Examples 1 to 7 can be decreased to 55 Hz or less while the Δx values, the Δx values, the Δy values, and the relative luminance intensities were maintained as 0.008 or less, 0.003 or less, and 74% or more, respectively. It is apparent that the Examples 1 to 7 are superior to the Controls according to total evaluation results.

TABLE 1

|  | Phosphor | Mixing Ratio (% by wt.) | Relative Brightness(%) | Critical Fusion Frequency (Hz) | CIE x and y Chromatic Value | Δx and Δy Value | Toxicity |
| --- | --- | --- | --- | --- | --- | --- | --- |
| Example 1 | (Y$_{0.899}$Gd$_{0.1}$Tb$_{0.001}$)$_2$O$_2$S | 8 | 75 | 54 | x = 0.355 | Δx = 0.007 | None |
|  | ZnS:Ag,Ga | 12 |  |  |  |  |  |
|  | In$_{0.995}$Tb$_{0.005}$BO$_3$ | 35 |  |  | y = | Δy = |  |

TABLE 1-continued

| | Phosphor | Mixing Ratio (% by wt.) | Relative Brightness(%) | Critical Fusion Frequency (Hz) | CIE x and y Chromatic Value | Δx and Δy Value | Toxicity |
|---|---|---|---|---|---|---|---|
| | $In_{0.97}Eu_{0.03}BO_3$ | 45 | | | 0.395 | 0.003 | |
| Example 2 | $(Y_{0.999}Tb_{0.001})_2O_2S$ | 12 | 76 | 55 | x = 0.352 | Δx = 0.005 | None |
| | hexagonal ZnS:Ag | 8 | | | y = | Δy = | |
| | $In_{0.995}Tb_{0.005}BO_3$ | 38 | | | 0.395 | 0.001 | |
| | $In_{0.97}Eu_{0.03}BO_3$ | 42 | | | 0.399 | | |
| Example 3 | $(Y_{0.998}Tb_{0.002})_2O_2S$ | 9 | 74 | 54 | x = 0.355 | Δx = 0.006 | None |
| | ZnS:Ag,Ga | 11 | | | y = | Δy = | |
| | $In_{0.995}Tb_{0.005}BO_3$ | 35 | | | 0.395 | 0.002 | |
| | $In_{0.97}Eu_{0.03}BO_3$ | 45 | | | 0.395 | | |
| Example 4 | $(Y_{0.5}Gd_{0.499}Tb_{0.001})_2O_2S$ | 11 | 76 | 55 | x = 0.355 | Δx = 0.006 | None |
| | ZnS:Ag,Ga | 9 | | | y = | Δy = | |
| | $In_{0.996}Eu_{0.003}Tb_{0.001}BO_3$ | 80 | | | 0.395 | 0.001 | |
| Example 5 | $(Y_{0.999}Tb_{0.001})_2O_2S$ | 12 | 75 | 55 | x = 0.353 | Δx = 0.008 | None |
| | hexagonal ZnS:Ag | 9 | | | y = | Δy = | |
| | $In_{0.995}Tb_{0.005}BO_3$ | 37 | | | 0.395 | 0.003 | |
| | $In_{0.87}Y_{0.1}Eu_{0.03}BO_3$ | 42 | | | 0.395 | | |
| Control 1 | $(Y_{0.999}Tb_{0.001})_2O_2S$ | 13 | 78 | 57 | x = 0.356 | Δx = 0.005 | None |
| | cubic ZnS:Ag | 7 | | | y = | Δy = | |
| | $In_{0.995}Tb_{0.005}BO_3$ | 35 | | | 0.394 | 0.002 | |
| | $In_{0.97}Eu_{0.03}BO_3$ | 45 | | | | | |
| Control 2 | $(Gd_{0.999}Tb_{0.001})_2O_2S$ | 13 | 74 | 57 | x = 0.357 | Δx = 0.005 | None |
| | cubic ZnS:Ag | 8 | | | y = | Δy = | |
| | $In_{0.995}Tb_{0.005}BO_3$ | 37 | | | 0.390 | 0.002 | |
| | $In_{0.86}La_{0.1}Eu_{0.04}BO_3$ | 42 | | | | | |
| Control 3 | cubic ZnS:Ag | 40 | 100 | 59 | x = 0.355 | Not measured | Toxic |
| | (ZnCd)S:Cu | 60 | | | y = 0.394 | | |
| Control 4 | cubic ZnS:Ag | 15 | 50 | 53 | x = 0.355 | Not measured | Toxic |
| | $Zn_2SiO_4$:Mn,As | 31 | | | y = 0.394 | | |
| | $Zn_3(PO_4)_2$:Mn | 54 | | | | | |
| Control 5 | cubic Zn:Ag | 15 | 78 | 53 | x = 0.352 | Not measured | Toxic |
| | $Zn_2SiO_4$:Mn,As | 22 | | | y = 0.397 | | |
| | $Cd_5(PO_5)_2Cl$:Mn | 63 | | | | | |
| Control 6 | cubic ZnS:Ag | 20 | 75 | 57 | x = 0.354 | Δx = 0.010 | None |
| | $In_{0.995}Tb_{0.005}BO_3$ | 35 | | | Δy = | Δy = | |
| | $In_{0.97}Eu_{0.03}BO_3$ | 45 | | y = | 0.398 | 0.008 | |
| Control 7 | ZnS:Ag,Ga | 21 | 74 | 55 | x = 0.351 | Δx = 0.027 | None |
| | $In_{0.995}Tb_{0.005}BO_3$ | 34 | | | y = | Δy = | |
| | $In_{0.97}Eu_{0.03}BO_3$ | 45 | | | 0.398 | 0.026 | |
| Example 6 | $(Y_{0.999}Tb_{0.001})_2O_2S$ | 12 | 77 | 55 | x = 0.354 | Δx = 0.004 | None |
| | $ZnS.0.002Sc_2O_3$:Ag | 8 | | | y = | Δy = | |
| | $In_{0.995}Eu_{0.003}Tb_{0.002}BO_3$ | 80 | | | 0.389 | 0.002 | |
| Example 7 | $(Y_{0.998}Tb_{0.002})_2O_2S$ | 11 | 75 | 55 | x = 0.352 | Δx = 0.005 | None |
| | ZnS:Ag,Ga | 9 | | | y = | Δy = | |
| | $In_{0.995}Eu_{0.003}Tb_{0.002}BO_3$ | 80 | | | 0.388 | 0.003 | |

Example 8

FIG. 3 is a graph showing chromatic changes of emission colors according to changes in currents supplied to the cathode-ray tube of the present invention and the conventional cathode-ray tube. The x chromatic values are plotted along the abscissa and the y chromatic values are plotted along the ordinate. Arrow S indicates chromatic changes of a cathode-ray tube of the present invention with a phosphor screen containing 10% by weight of phosphor A represented by formula $(Y_{0.999}Tb_{0.001})_2O_2S$, 10% by weight of phosphor B represented by formula ZnS:Ag,Ga, 35% by weight of phosphor (d-1) represented by formula $In_{0.995}Tb_{0.005}BO_3$, and 45% by weight of phosphor (d-2) represented by formula $In_{0.97}Eu_{0.03}BO_3$ when the excitation current is increased from 50 to 300 μA. Arrow T indicates chromatic changes in a cathode-ray tube with a phosphor screen (Control 8) containing 20% by weight of a cubic phosphor represented by formula ZnS:Ag,Ga, 35% by weight of a phosphor represented by formula $In_{0.995}Tb_{0.005}BO_3$, and 45% by weight of a phosphor represented by formula $In_{0.97}Eu_{0.03}BO_3$ when the excitation current is increased in the same manner as in Example 8. Chromatic changes depending on changes in current supplied to the cathode-ray tube of the present invention are smaller than those to the conventional cathode-ray tube.

What is claimed is:

1. A cathode-ray tube with a phosphor screen comprising:
    5 to 15 wt. % of phosphor A;
    5 to 15 wt. % of phosphor B; and
    70 to 90 wt. % of phosphor C, said phosphor A being a bluish white-emitting phosphor $(Y_{l-x-y}Gd_xTb_y)_2O_2S$ ($0 \leq X \leq 0.999999$ and $0.000001 \leq y \leq 0.01$), said phosphor B being at least one of a blue-emitting silver-activated hexagonal zinc sulfate (ZnS:Ag) phosphor, a blue-emitting silver-activated cubic zinc sulfate phosphor (ZnS:Ag,X) (wherein X is at least one element selected from the group consisting of Ga, In, and Sc), and a blue-emitting silver-activated cubic zinc sulfate-scandium oxide phosphor (ZnS·zSc$_2$O$_3$:Ag (wherein $1 \times 10^{-5} \leq z \leq 8 \times 10^{-2}$)), and said phosphor C being a yellow-emitting phosphor (In$_{l-p-q-r}$M$_p$Tb$_q$Eu$_r$BO$_3$) (wherein M is at least one element selected from the group consisting of Sc, Lu, Y, Gd, and Ga, and p, q, and r satisfy $0 \leq p \leq 0.2$, $0.0005 \leq q \leq 0.05$, and $0.001 \leq r \leq 0.1$).

2. A cathode-ray tube with a phosphor screen comprising:
   5 to 15 wt. % of phosphor A.
   5 to 15 wt. % of phosphor B; and
   70 to 90 wt. % of phosphor D, said phosphor A being a bluish white-emitting phosphor (Yl-x-yGdxTby)2O2S ($0 \leq X \leq 0.999999$ and $0.000001 \leq y \leq 0.01$), said phosphor B being at least one of a blue-emitting silver-activated hexagonal zinc sulfate (ZnS:Ag) phosphor, a blue-emitting silver-activated cubic zinc sulfate phosphor (ZnS:Ag,X) (wherein X is at least one element selected from the group consisting of Ga, In, and Sc), and a blue-emitting silver-activated cubic zinc sulfate-scandium oxide phosphor (ZnS·zSc$_2$O$_3$:Ag wherein $1 \times 10^{-5} \leq z \leq 8 \times 10^{-2}$)), and said phosphor D being a phosphor mixture of (d-1) which is a green-emitting phosphor (In$_{l-p-q}$M$_p$TB$_q$Eu$_r$BO$_3$) (wherein M is at least one element selected from the group consisting of Sc, Lu, Y, Gd, and Ga, and p, and q satisfy $0 \leq p \leq 0.2$ and $0.0005 \leq q \leq 0.05$), and (d-2) which is a red-emitting phosphor (In$_{l-q-r}$M$_p$Eu$_r$BO$_3$) (wherein M is at least one element selected from the group consisting of Sc, Lu, Y, Gd, and Ga, and p, and r satisfy $0 \leq p \leq 0.2$ and $0.001 \leq r \leq 0.1$), a weight ratio of (d-1) to (d-2) ranging from 3 : 7 to 7 : 3.

* * * * *